United States Patent
Cancho Vera et al.

(10) Patent No.: US 11,747,048 B2
(45) Date of Patent: Sep. 5, 2023

(54) METHOD FOR REPAIRING OR IMPROVING ABSORBER TUBES WITH A LOSS OF THERMAL INSULATION OF OR FOR SOLAR THERMAL INSTALLATIONS

(71) Applicant: COBRA INSTALACIONES Y SERVICIOS, S.A., Badajoz (ES)

(72) Inventors: José Carlos Cancho Vera, Badajoz (ES); Francisco Sánchez Matamoros, Badajoz (ES)

(73) Assignee: COBRA INSTALACIONES Y SERVICIOS, S.A, Madrid (ES)

( * ) Notice: Subject to any disclaimer, the term of this patent is extended or adjusted under 35 U.S.C. 154(b) by 10 days.

(21) Appl. No.: 17/529,844

(22) Filed: Nov. 18, 2021

(65) Prior Publication Data
US 2022/0163237 A1    May 26, 2022

(30) Foreign Application Priority Data
Nov. 23, 2020    (ES) ............................... ES202031171

(51) Int. Cl.
*F24S 40/46*    (2018.01)
*F24S 10/40*    (2018.01)
*F24S 20/20*    (2018.01)

(52) U.S. Cl.
CPC .............. *F24S 40/46* (2018.05); *F24S 10/45* (2018.05); *F24S 20/20* (2018.05)

(58) Field of Classification Search
None
See application file for complete search history.

(56) References Cited

U.S. PATENT DOCUMENTS

| | | | | |
|---|---|---|---|---|
| 4,886,048 A | * | 12/1989 | Labaton ................ | F24S 10/45 165/104.27 |
| 9,920,956 B2 | * | 3/2018 | Kuckelkorn ............ | F24S 40/40 |
| 10,458,680 B2 | * | 10/2019 | Kuckelkorn ............ | F24S 10/45 |
| 10,571,154 B2 | * | 2/2020 | Kuckelkorn ............ | F24S 40/46 |
| 2017/0219250 A1 | * | 8/2017 | Kuckelkorn ............ | F24S 10/45 |
| 2017/0219251 A1 | * | 8/2017 | Kuckelkorn ......... | B23K 26/382 |
| 2019/0178532 A1 | * | 6/2019 | Lang ....................... | F24S 10/45 |

FOREIGN PATENT DOCUMENTS

| | | |
|---|---|---|
| ES | 2628632 A2 | 8/2017 |
| ES | 2628680 A2 | 8/2017 |
| ES | 2637650 A2 | 10/2017 |
| ES | 2725975 A1 | 10/2019 |

OTHER PUBLICATIONS

Translation of ES-2725974-A1 (Year: 2019).*

* cited by examiner

*Primary Examiner* — Jacob J Cigna
(74) *Attorney, Agent, or Firm* — Hayes Soloway PC

(57) ABSTRACT

The invention relates to a method which comprises making a hole in a metallic support of an absorber tube, putting a vacuum pump in fluid communication with the chamber of the absorber tube by means of the hole, actuating the vacuum pump to generate a vacuum in the chamber until reaching a predetermined vacuum threshold, and introducing an inert gas inside the chamber and performing a plurality of sweeps with said inert gas, removing hydrogen from the chamber, allowing to thus reduce or remove the accumulation of hydrogen in said chamber, such that, as a result, at least part of the hydrogen absorption capacity of the getter material is recovered.

11 Claims, 2 Drawing Sheets

METHOD FOR REPAIRING OR IMPROVING ABSORBER TUBES WITH A LOSS OF THERMAL INSULATION OF OR FOR SOLAR THERMAL INSTALLATIONS

CROSS-REFERENCE TO RELATED APPLICATIONS AND PRIORITY

This patent application claims priority from Spanish Patent Application No. P202031171 filed Nov. 23, 2020. This patent application is herein incorporated by reference in its entirety.

OBJECT OF THE INVENTION

The present invention can be included in the technical field of solar energy, in particular energy generation in parabolic trough and Fresnel solar thermal installations. More specifically, the object of the invention relates to a method for repairing or improving absorber tubes with a loss of thermal insulation (presence of hydrogen or reduced vacuum level in the insulating chamber) of or for solar thermal installations, both for parabolic trough and for Fresnel installations, which removes or reduces the accumulated hydrogen in the vacuum chamber and improves vacuum level, and it also allows the characteristics of the initial getter material inside said vacuum chamber to be restored.

BACKGROUND OF THE INVENTION

In parabolic trough or also in Fresnel solar thermal installations, there are arranged receiver tubes which transport a heat transfer fluid, known as thermal oil, or also as HTF.

A receiver tube comprises different parts, wherein the following stand out: an inner tube through which the thermal oil circulates, and an outer tube, coaxial with the inner tube, which allows the passage of solar radiation to reach the thermal oil in the inner tube, both inner and outer tubes being separated by a chamber which is initially under vacuum conditions to insulate the thermal losses of the inner tube and contains a getter material that absorbs hydrogen.

The thermal oil circulating through the inner tube tends to degrade both due to the passing of time and due to the effect of the high temperatures it withstands. Under these conditions, hydrogen is given off from the thermal oil. The inner tube is permeable to hydrogen, but the outer tube is not; as a result, the hydrogen that is given off is stored in the chamber. The getter material absorbs this hydrogen until saturation.

The accumulation of hydrogen in the chamber, once the getter is saturated, causes the vacuum to be reduced, losing its insulating capacity, whereby energy losses in the receiver tube increase, such that the performance of the installation drops.

At present, when the accumulation of hydrogen and, therefore, the associated energy losses, exceed a threshold, the receiver tube with a vacuum loss is replaced with a new receiver tube under optimal vacuum conditions.

The replacement of the receiver tube involves substantial economic costs, such as the replacement of the receiver tube (an expensive element), the production loss for the entire system where that tube is located (solar field availability decreases), cutting, welding and non-destructive testing of the replacement tube, and the environmental risk increases because the thermal oil system has to be emptied and filled.

DESCRIPTION OF THE INVENTION

The present invention describe a method for repairing or improving absorber tubes with loss of vacuum in the chamber of or for solar thermal installations, wherein the absorber tubes are of the type comprising: an inner tube through which a heat transfer fluid circulates; an outer tube coaxial with the inner tube, a chamber comprising getter material to absorb hydrogen, said chamber defined between the inner tube and the outer tube and initially under vacuum conditions; and a metallic support, at both ends, which supports the outer tube and is in contact with the chamber;

wherein the method comprises the steps of:
a) making a hole in the metallic support, said hole being of a diameter such that it allows a vacuum level capable of removing the hydrogen from the chamber in a time of less than 20 minutes by means of sweeps of an inert gas to be established,
b) putting a vacuum pump in fluid communication with the chamber of the absorber tube by means of the hole,
c) actuating the vacuum pump to generate a vacuum in the chamber until reaching a predetermined vacuum threshold,
d) performing sweeps by means of introducing the inert gas inside the chamber, thus removing hydrogen, allowing the accumulation of the hydrogen inside said chamber to be reduced or removed, wherein after each sweep, the vacuum pump is actuated again to generate a vacuum in the chamber, and as a result at least part of the hydrogen absorption capacity of the getter material is recovered,
e) interrupting fluid communication between the chamber and the vacuum pump, without losing the vacuum of said chamber.

With the process mentioned above, the removal of hydrogen and the recovery, in part, of the vacuum originally lost can be performed in the chamber of the receiver tube in an effective manner and in a shorter time, with the subsequent increase in thermal performance.

Preferably, the diameter of the hole is a diameter sufficient for removing most of the hydrogen from the chamber in a time of preferably less than 20 minutes in a sweep of inert gas.

Furthermore, with said process the original getter material inside the chamber recovers part of the initial characteristics and hydrogen absorption capacity.

Preferably, the method comprises a heating step, after starting to generate the vacuum, wherein the chamber is heated, and accordingly, the getter material of said chamber is heated, such that the vacuum is strengthened, and it furthermore allows the getter material to give off accumulated hydrogen.

In a preferred embodiment, the heating step comprises covering the receiving tubes with an insulating and fire-resistant blanket without blocking the flow of the heat transfer fluid. In the case of assembling the insulating blanket on the glass of the outer tube, at least part of the hydrogen absorption capacity of the getter material is recovered.

The method, may further comprise an additional step of adding new getter material inside the chamber using the hole, wherein said step is performed after making the hole in the metallic support and prior to putting the vacuum pump in fluid communication with the chamber of the absorber tube.

The step of adding new getter material may comprise a step selected from:
- welding a part or capsule with new getter material in the hole, with said new getter material arranged inside the chamber,
- attaching at least one part or capsule containing new getter material to the metallic support using a magnetic element, with said new getter material arranged inside the chamber,
- attaching at least one part or capsule containing new getter material to the metallic support by means of a mechanical attachment element, with said new getter material arranged inside the chamber.

Preferably, before interrupting the fluid communication between the chamber and the vacuum pump, the method further comprises:
- measuring the value of the vacuum and the amount of inert gas,
- an effectiveness estimating step which comprises reaching a vacuum threshold and a predetermined threshold for the amount of inert gas,
- next, and once the predetermined thresholds of the effectiveness estimating step have been reached, interrupting the fluid communication between the chamber and the vacuum pump, without losing the vacuum.

Preferably, the step of putting the vacuum pump in communication with the chamber comprises a step of welding an access tube to the support, wherein at least part of the access tube, which comprises a free end, projects from the support, and then putting the vacuum pump in fluid communication with the free end of the access tube.

In a preferred embodiment, prior to putting the vacuum pump in fluid communication with the free end of the access tube, the hole is formed, and new getter material is added through said hole; next, the access tube is assembled in the support, and then the vacuum pump is put in communication with the chamber.

The access tube can incorporate, at an end opposite the free end, a boring tool, such that the assembly of the access tube comprises first making the hole by means of the boring tool and then welding the access tube in the hole.

Preferably, the step of interrupting the fluid communication between the chamber and the vacuum pump comprises a step selected from:
- crimping the access tube; and
- using a valve intercalated between the vacuum pump and the chamber.

"Crimping" is understood to be an operation in which the access tube is pressed/choked, whereby deforming its section and its internal surfaces come to be in close contact with one another, producing a sealed closure.

DESCRIPTION OF THE DRAWINGS

As a complement to the description provided herein, and for the purpose of helping to make the features of the invention more readily understandable, in accordance with a preferred practical exemplary embodiment thereof, said description is accompanied by a set of drawings constituting an integral part of the same, which by way of illustration and not limitation, represent the following.

PREFERRED EMBODIMENT OF THE INVENTION

Figure 1:
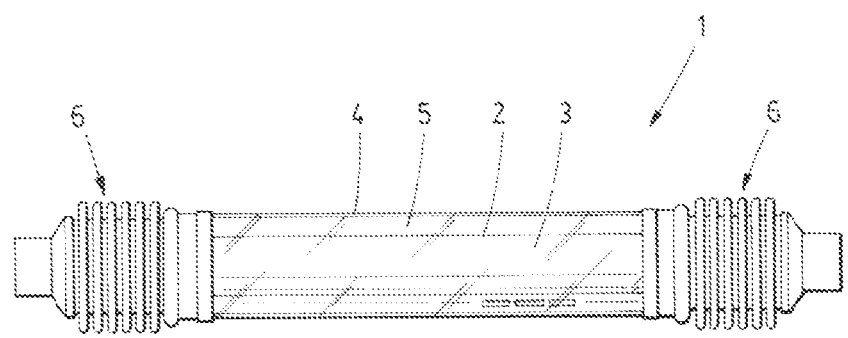
FIG. 1 shows a schematic side view of an absorber tube to which the method of the invention is applicable.
Figure 2:
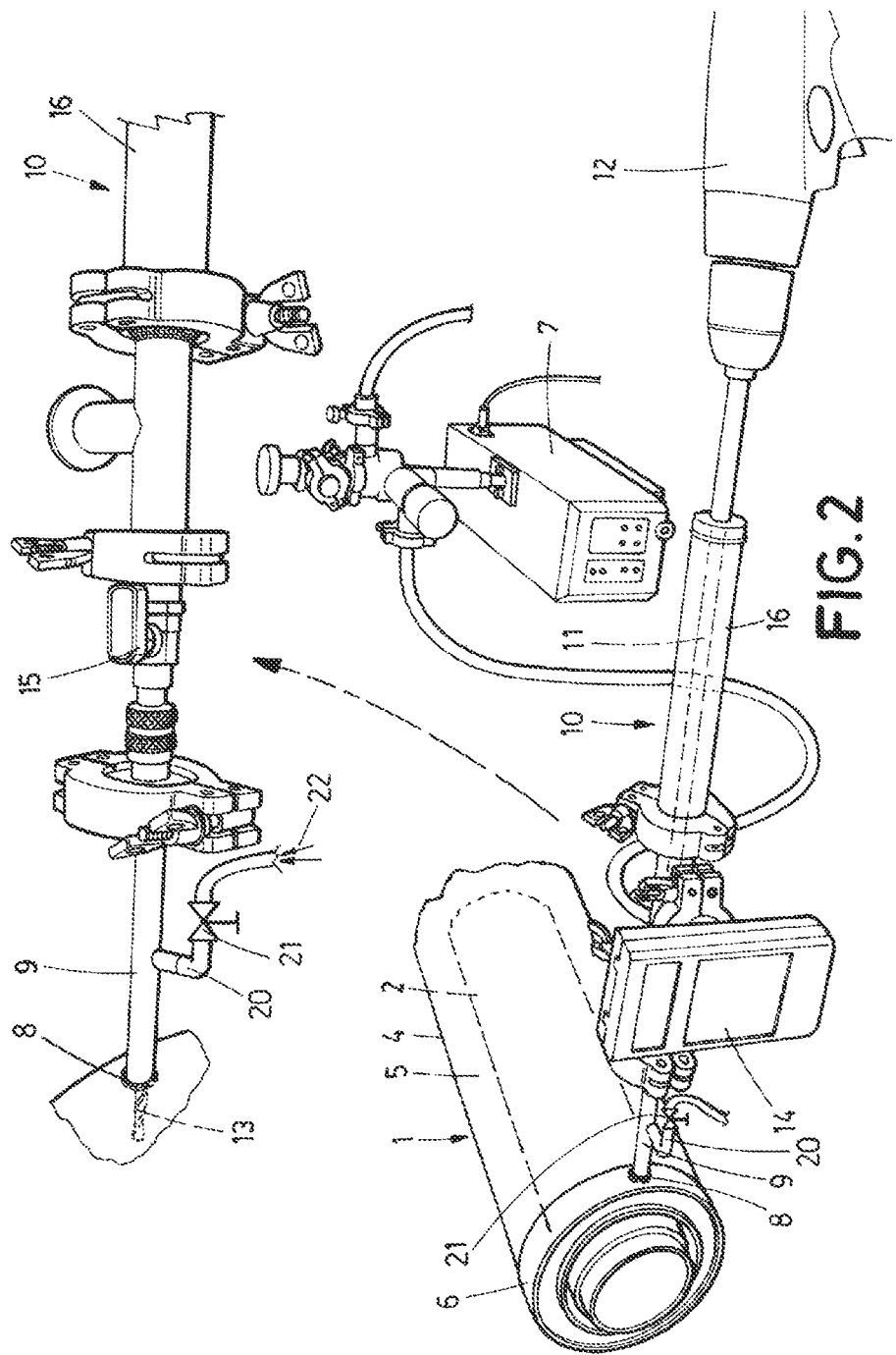
FIG. 2 shows a device by way of example which could be used for performing the method of the invention.

A detailed description of a preferred exemplary embodiment of the object of the invention is provided below, with the aid of the attached FIGS. 1-2 described above.

The object of the invention relates to a method for repairing or improving absorber tubes with a loss of vacuum (1) of or for solar thermal installations, both for parabolic trough and for Fresnel installations, for example, when these absorber tubes (1) have lost at least part of the vacuum, as a result, among others, of the chamber (5) being accessed by the hydrogen produced due to degradation of heat transfer fluid (3), usually a thermal oil, which is transported through the inner tube (2), wherein said hydrogen is absorbed by the getter material; however, once the getter is saturated, the accumulation of hydrogen causes the vacuum to be reduced, losing insulating capacity, whereby energy losses in the absorber tube (1) increase, such that the performance of the installation drops.

The absorber tubes (1) to which the method of the invention is applied comprise:
- an inner tube (2) through which a thermal oil (3) circulates;
- an outer tube (4) coaxial with the inner tube (2);
- a chamber (5) defined between the inner tube (2) and the outer tube (4), initially under vacuum conditions; and
- a metallic support (6) which supports the outer tube (4) and is in contact with the chamber (5).

According to the preferred embodiment of the invention, the method uses the device shown in the figures, and as an alternative to replacing the absorber tube (1) concerned, the method for repair or improvement comprises the following steps:
a) making a hole (8) in the metallic support (6),
b) optionally introducing new getter material in the chamber,
c) welding a tube in the hole and connecting it to a vacuum pump, putting the vacuum pump (7) in fluid communication with the chamber (5) of the absorber tube (1) by means of the hole (8),
d) actuating the vacuum pump (7) to generate a vacuum in the chamber (5) until reaching a predetermined vacuum threshold,
e) sweeping with an inert gas (22) inside the chamber (5) and performing a plurality of sweeps of said inert gas (22) inside the chamber (5), removing hydrogen and thus reducing or removing the accumulation of hydrogen in said chamber (5), and wherein after each sweep, the vacuum pump (7) is actuated again to generate a vacuum in the chamber (5), as a result, at least part of the hydrogen absorption capacity of the getter material is recovered,
f) interrupting fluid communication between the chamber (5) and the vacuum pump (7), without losing the vacuum of said chamber (5).

Furthermore, according to the preferred embodiment of the invention, the method comprises monitoring vacuum values by means of a vacuum gauge (14) and amount of inert gas (22) by means of vacuum gauge; and an effectiveness estimating step which comprises reaching a vacuum threshold and a predetermined threshold for the amount of inert gas (22).

As a result, once the predetermined thresholds of the effectiveness estimating step have been reached, the fluid communication between the chamber (5) and the vacuum pump (7) is interrupted, without losing the vacuum.

According to a preferred exemplary embodiment mentioned, the vacuum pump (7) is communicated with the support (6) through an access tube (9), which is preferably rigid, coupled to the support (6) before connecting the vacuum pump (7) to the chamber (5), with at least part of the access tube (9) projecting from the support (6).

Under these conditions, to form the hole (8) the following can be done:

make a hole (8) in the support (6) with a drill.

In particular, according to a first possibility, first the hole (8) is made in the support (6), and once the hole (6) is made, the access tube (9) is assembled and welded on the support (6), and next the vacuum pump (7) is put in communication with the chamber (5).

In a preferred embodiment of the invention, after making the hole (8) in the support (6) and before putting the vacuum pump in communication with the chamber (5), the method comprises an additional and optional step which consists of adding new getter material inside the chamber (5) using the hole (8).

More particularly, according to some of the contemplated possibilities, said step of adding new getter material comprises at least one of the following steps:

welding a part or capsule with new getter material in the hole (8), with said new getter material arranged inside the chamber (5); and attaching at least one part or capsule containing new getter material to the metallic support (6) using a magnetic element, with said new getter material arranged inside the chamber (5); and attaching at least one part or capsule containing new getter material to the metallic support (6) by means of a mechanical attachment element, with said new getter material arranged inside the chamber (5).

Furthermore, in a preferred embodiment of the invention, the method comprises a heating step, once the step of generating the initial vacuum has started, wherein the chamber (5) is heated, and accordingly, the getter material located in said chamber (5) is also heated, such that the vacuum is strengthened and it furthermore allows the getter material to give off accumulated hydrogen.

In the preferred embodiment described above, the heating step comprises covering the receiver tubes with an insulating and fire-resistant blanket without blocking the flow of the heat transfer fluid (3).

According to a first possibility, first the hole (8) is made in the support (6), and once the hole (6) is made, the access tube (9) is assembled in the support (6) and fixed, for example, by welding the access tube (9) to the support (6). This allows new getter material to be added inside the chamber (5) after making the hole (6) and before welding the access tube (9) to the support (6).

Likewise, for any of the embodiments and examples described above, the step of interrupting the fluid communication between the chamber (5) and the vacuum pump (7) may comprise crimping the access tube (9), as well as using a valve (15) intercalated between the vacuum pump (7) and the chamber (5), i.e., upstream of the vacuum pump (7), where "upstream" is understood to mean that the vacuum pump (7) transfers a fluid from the chamber (5) which, in its travel due to the suction effect of the vacuum pump (7), passes through the valve (15) on the way to the vacuum pump (7). In particular, the valve (15) can be assembled in the access tube (9) or in the intermediate tube (10). "Crimping" is understood to be an operation in which the access tube (9) is pressed/choked, whereby deforming its section and its internal surfaces come to be in close contact with one another, producing a sealed closure.

The invention claimed is:

1. A method for repairing or improving absorber tubes with loss of thermal insulation of or for solar thermal installations, wherein the absorber tubes are of the type comprising: an inner tube through which a heat transfer fluid circulates; an outer tube coaxial with the inner tube, a chamber comprising getter material to absorb hydrogen, said chamber defined between the inner tube and the outer tube and initially under vacuum conditions; and a metallic support, at least one end, which supports the outer tube and is in contact with the chamber; comprising at least the steps:

a) making a hole in the metallic support, said hole being of a diameter such that it allows a vacuum level capable of removing hydrogen from the chamber in a time of less than 20 minutes by sweeps with an inert gas to be established, b) putting a vacuum pump in fluid communication with the chamber of the absorber tube through the hole, c) actuating the vacuum pump to generate a vacuum in the chamber until reaching a predetermined vacuum threshold, d) performing sweeps by introducing an inert gas into the chamber, thus removing hydrogen, allowing the accumulation of said hydrogen inside said chamber to be reduced or removed, wherein after each sweep, the vacuum pump is actuated again to generate a vacuum in the chamber, and as a result at least part of the hydrogen absorption capacity of the getter material is recovered, e) interrupting fluid communication between the chamber and the vacuum pump, without losing the vacuum of said chamber, wherein the step of putting the vacuum pump in communication with the chamber comprises a step of welding an access tube to the support, wherein at least part of the access tube, which comprises a free end, projects from the support, and then putting the vacuum pump in fluid communication with the free end of the access tube, wherein prior to putting the vacuum pump in fluid communication with the free end of the access tube, the hole is formed, and new getter material is added through said hole; next, the access tube is assembled in the support, and then the vacuum pump is put in communication with the chamber.

2. The method according to claim 1, further comprising: measuring a value of the vacuum and the amount of inert gas; and an effectiveness estimating step which comprises reaching the vacuum threshold and a predetermined threshold for the amount of inert gas; and once the predetermined thresholds of the effectiveness estimating step have been reached, interrupting the fluid communication between the chamber and the vacuum pump, without losing the vacuum.

3. The method according to claim 1, wherein the access tube incorporates, at an end opposite the free end, a boring tool, such that the assembly of the access tube comprises first making the hole with the boring tool and then welding the access tube in the hole.

4. The method according to claim 1, wherein the step of interrupting the fluid communication between the chamber and the vacuum pump comprises a step selected from:

crimping the access tube; and
using a valve intercalated between the vacuum pump and the chamber.

5. The method according to claim 1, wherein the step of sweeping the existing hydrogen with the inert gas inside the chamber and performing a plurality of sweeps is performed with a connector tube operatively connected to the access tube and in fluid communication with the chamber.

6. The method according to claim 1, comprising a heating step after starting to generate the vacuum, wherein the chamber is heated, and accordingly, the getter material of said chamber is heated, such that the vacuum is strengthened and, whereby the heating allows the getter material to give off accumulated hydrogen.

7. The method according to claim 6, wherein the heating step comprises covering the absorber tubes with an insulating and fire-resistant blanket without blocking the flow of the heat transfer fluid.

8. The method according to claim 1, comprising an additional step of adding new additional getter material inside the chamber using the hole, wherein said additional step of adding is performed after making the hole in the metallic support and prior to putting the vacuum pump in fluid communication with the chamber.

9. The method according to claim 8, wherein the additional step of adding the new additional getter material further comprises
welding at least one part or capsule with new getter material in the hole, with said new getter material arranged inside the chamber.

10. The method according to claim 8, wherein the additional step of adding the new additional getter material further comprises attaching at least one part or capsule containing the new additional getter material to the metallic support using a magnetic element, with said new additional getter material inside the chamber.

11. The method according to claim 8, wherein the additional step of adding the new additional getter material further comprises attaching at least one part or capsule containing the new additional getter material to the metallic support with a mechanical attachment element, wherein said new additional getter material is arranged inside the chamber.

* * * * *